United States Patent [19]

Cenanovic

[11] Patent Number: 4,909,980
[45] Date of Patent: Mar. 20, 1990

[54] ELECTROMAGNETIC APPARATUS FOR POSITIONING OBJECTS LOCATED BEHIND A CONDUCTIVE WALL

[75] Inventor: Matija Cenanovic, Ontario, Canada

[73] Assignee: Ontario Hydro, Ontario, Canada

[21] Appl. No.: 225,675

[22] Filed: Jul. 26, 1988

Related U.S. Application Data

[62] Division of Ser. No. 51,794, May 20, 1987, Pat. No. 4,867,940.

[30] Foreign Application Priority Data

Jul. 26, 1986 [CA] Canada .................................. 514463

[51] Int. Cl.$^4$ ............................................. G21C 19/00
[52] U.S. Cl. ..................................... 376/260; 310/13; 335/223
[58] Field of Search ............... 376/366, 401, 450, 260, 376/258, 291, 292; 310/27, 30, 166, 12, 13, 14; 335/223

[56] References Cited

U.S. PATENT DOCUMENTS 4,613,477  9/1986  Dableh ................................ 376/366

OTHER PUBLICATIONS

"The AC Device for Repositioning of Garter Springs in CANDU Reactors", M. Cenanovic and H. Maureira, Nuclear Journal of Canada, vol. 1, No. 4, Dec. 1987, p. 355.

"Magnetic Metal Forming by Reversed Electromagnetic Forces", M. B. Cenanovic, 4th IEEE International Pulsed Power Conference, Albuquerque, New Mexico, Jun. 1983, Paper 6.4.

"Electromagnetic Forming of Zirconium and Other Strong Alloys", M. B. Cenanovic, 20th Annual Conference of Metallurgists, Hamilton, Ontario, Aug. 23-27, 1981, Paper 11.3.

Primary Examiner—Daniel Wasil
Attorney, Agent, or Firm—Rogers, Bereskin & Parr

[57] ABSTRACT

Apparatus for repositioning garter springs around the pressure tubes of Candu-type nuclear reactors. A primary coil having a high permeability core is inserted into the pressure tube. The coil is energized by an alternating current of a frequency and amplitude sufficient to produce a primary alternating electromagnetic field that penetrates the wall and induces an eddy current in the garter spring. A secondary alternating electromagnetic field is also produced and is reactive with the primary field to produce a travelling electromagnetic field of sufficient intensity and of such direction that the resultant of the electromagnetic forces acting on the garter spring causes the spring to move along the tube.

15 Claims, 3 Drawing Sheets

ELECTROMAGNETIC APPARATUS FOR POSITIONING OBJECTS LOCATED BEHIND A CONDUCTIVE WALL

This is a division of application Ser. No. 051,794 filed May 20, 1987, now U.S. Pat. No. 4,867,940.

FIELD OF THE INVENTION

This invention relates generally to an electromagnetic apparatus for controllably moving a conductive body from a first position to a second position and more particularly to apparatus for remotely positioning weakly conductive objects located behind a relatively conductive wall. An application of the invention is in remotely repositioning spacers called "garter springs" used for separating coaxial pressure tubes and calandria tubes in Candu nuclear reactors.

BACKGROUND OF THE INVENTION

In some heavy water-moderated nuclear reactors, for example Candu reactors, fuel for the nuclear reaction is carried in an array of pressure tubes disposed within a calandria vessel forming the reactor core. Heavy water is circulated through the pressure tubes and is heated by the nuclear reaction; the heated heavy water can then be used to drive turbines for generating electricity. Each pressure tube is surrounded by and coaxial with a calandria tube and the nuclear reaction is moderated by heavy water disposed within the calandria vessel externally of the calandria tubes. The temperature of this heavy water is significantly lower than the temperature of the heavy water in the pressure tubes when the reactor is in operation. Each pressure tube is spaced from the associated calandria tube by means of spacers called garter springs which are fitted around the pressure tubes at intervals along its length. However, it has been found that, over a period of time, the garter springs tend to migrate along the pressure tubes under the influence of vibrations generated in normal operation of the reactor and that the garter springs may eventually move to positions at which they no longer act as effective spacers, permitting the pressure tubes to sag.

It is therefore desirable to be able to reposition the garter springs to ensure proper spacing between the pressure tubes and the calandria tubes. The difficulty is that the garter springs are not directly accessible since the space between the two tubes is closed in the assembled reactor. Disassembly of the pressure tubes and calandria tubes is not practicable because the tubes are radioactive and such disassembly would be very expensive.

Accordingly, a specific object of the invention is to provide a non-intrusive, non-destructive apparatus for repositioning garter springs or other conductive bodies which are shielded by a relatively conductive wall (e.g. the wall of the pressure tube).

SUMMARY OF THE INVENTION

The invention provides an electromagnetic apparatus for controllably moving a conductive body from a first position to a second position, the conductive body being separated from the apparatus by a conductive wall. The apparatus includes a primary coil having a high permeability core, the coil being adapted to be energized by an alternating current of a frequency and amplitude sufficient to produce a primary alternating electromagnetic field that is capable of penetrating the wall and inducing an eddy current in the conductive body when the primary coil is in the proximity of the conductive body and the conductive body is in the first position. The apparatus also has means electromagnetically coupled to the primary coil for producing a secondary alternating electromagnetic field that is reactive with the primary field to produce a travelling electromagnetic field of sufficient intensity and of such direction that the resultant of the electromagnetic forces acting on the conductive body causes the body to move from the first position to the second position.

When the apparatus is used to reposition a garter spring between a pressure tube and a calandria tube, the apparatus will be positioned within the pressure tube with the wall of the pressure tube separating the apparatus from the garter spring. The primary coil is positioned in proximity with the garter spring (although shielded therefrom by the wall of the pressure tube) and the current in the primary coil will create an electromagnetic field which penetrates the wall of the pressure tube and induces a current in the garter spring. The secondary electromagnetic field producing means generates a field that is reactive with the primary field to produce a travelling electromagnetic field in the direction of the longitudinal axis of the pressure tube, causing the garter spring to move controllably to a second position. The distance the garter spring travels may be controlled by selecting parameters such as the strength of the primary and secondary fields and the overall length of the apparatus. The apparatus has been shown capable of repositioning garter springs with sufficiently low input currents that there is no resulting harm to any of the components of the reactor.

The present invention permits the use of continuous rather than pulsating energizing current for producing the primary electromagnetic field. By creating in effect a travelling electromagnetic wave, the level of energizing current that is required is much less than would be required if the conductive body were subjected only to high energy electromagnetic impulses, thus reducing the risk of destruction or deterioration of any components subjected to the electromagnetic field.

BRIEF DESCRIPTION OF THE DRAWINGS

In order to permit a better understanding of the present invention, and to show more clearly how it may be carried into effect, reference will now be made to the accompanying drawings which show preferred embodiments of the present invention by way of example, and in which.

DETAILED DESCRIPTION OF THE PREFERRED EMBODIMENT

Figure 1:
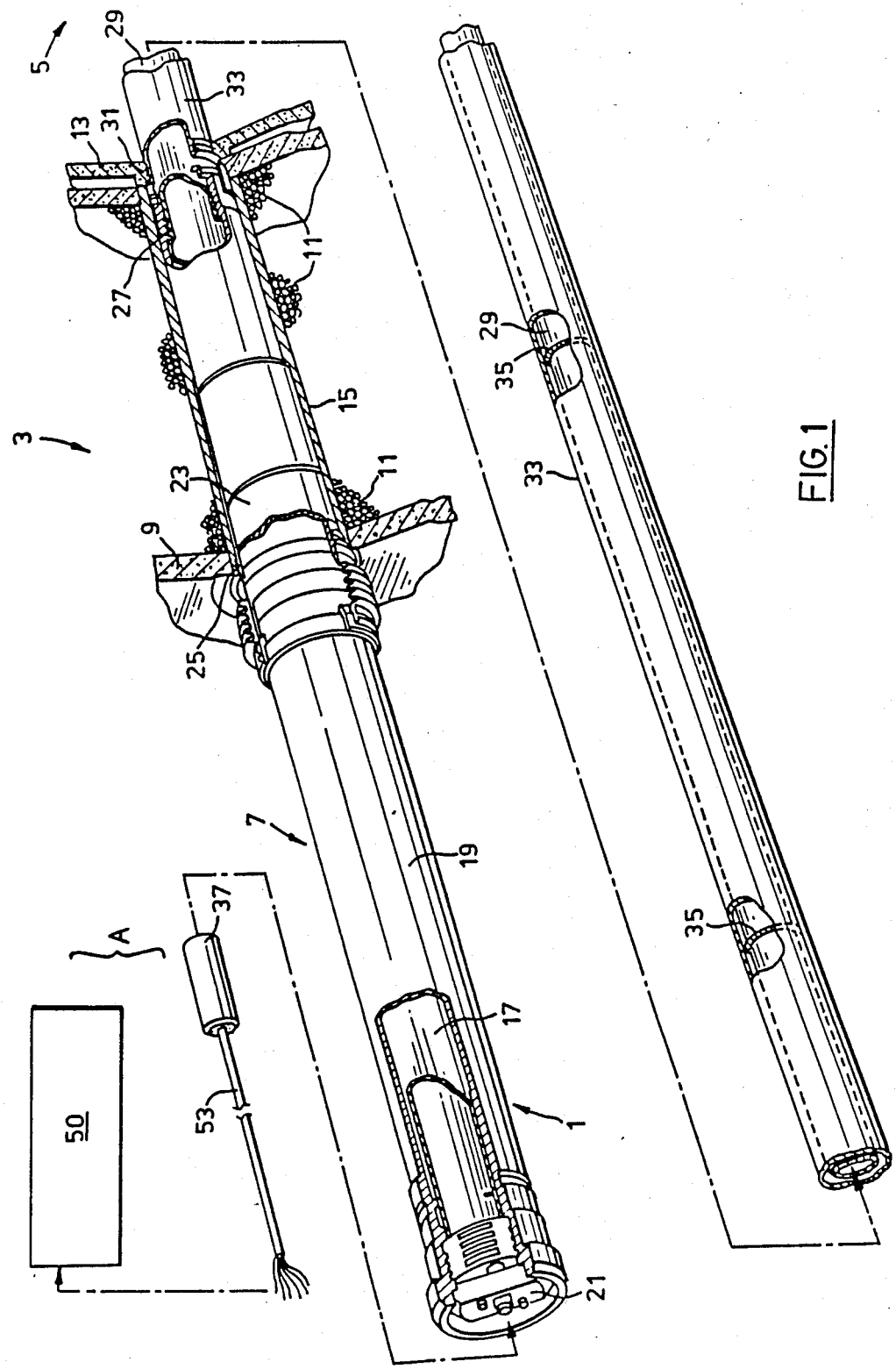
FIG. 1 is a perspective view of a conventional nuclear reactor fuel channel assembly in association with a schematic representation of an apparatus of the form provided by the invention.

Referring to the drawings, FIG. 1 shows the principal components of a fuel channel assembly 1 of the type used in a Candu nuclear reactor As is well known, a reactor of this type includes an array of similar fuel channel assemblies supported within a calandria vessel (not shown). FIG. 1 shows the fuel channel assembly from one end of the reactor core. An end shield generally denoted by reference numeral 3 separates the reactor core area or calandria chamber (generally indicated at 5) from an external fueling area 7. A similar end shield is provided at the opposite end of the reactor core. As shown in the drawings, end shield 3 includes a fueling machine-side wall or "tubesheet" 9, lead shielding balls 11 and a calandria-side tubesheet 13. A lattice tube 15 extends between the two tubesheets and provides a passageway for the fuel channel assembly 10 through the end shield 3. Typically, end shield 3 is of a width of approximately 3½ feet.

The fuel channel assemblies 1 carry fuel, normally in the form of bundles of fuel rods (not shown), from the fueling area 7 to the reactor core 5. The assemblies also support the fuel rods within the core during normal operation of the reactor, all as is well known in the art.

Protruding from the fuelling area 7 side of the end shield 3 is a liner tube 17 surrounded by an end fitting body 19. At their outer ends, tube 17 and body 19 are enclosed by a channel closure 21. The end fitting body 19 and an outboard end fitting sleeve 23 are connected near the machine-side tubesheet 9 by a roll joint 25. The end fitting body 19 is connected by a roll joint 27 to a pressure tube 29 for containing fuel rods (not shown), within the lattice tube 15 near the calandria-side tubesheet 13. Surrounding the pressure tube 29, beginning at a roll joint 31, is a calandria tube 33. The pressure and calandria tubes 29, 33 extend from tubesheet 13 into the calandria chamber forming the reactor core. Within the reactor core, the nuclear reaction is moderated by heavy water that circulates externally of the calandria tubes 33 while heavy water is also circulated separately through the pressure tubes for heating. This heated heavy water is then used to drive turbines for generating electricity, in a nuclear generating plant.

Due to the temperature differential between the relatively hot heavy water within the pressure tubes 29 and the cooler heavy water externally of the calandria tubes 33 it is necessary to maintain the pressure tubes and calandria at a spacing from one another, as shown in FIG. 1. Typically, this spacing may be nominally greater than about ⅛ inch. In a commercial reactor, the distance between end shield 3 and the corresponding end shield at the other end of the reactor core may be significant, for example, of the order of 26 feet. Over this distance, the calandria tube and pressure tube are unsupported. It has been found that, during operation of the reactor, the pressure tubes tend to sag within the calandria tubes. If a pressure tube touches the surrounding calandria tube, the temperature differential between the two tubes may cause the pressure tube to deteriorate and eventually to crack. To guard against this, several garter springs indicated at 35 in FIG. 1 are fitted around the pressure tube 29 to act as spacers. The garter springs are spaced along the length of the pressure tubes 29.

Each garter spring 35 comprises a long, narrow relatively tightly wound coil 34 with a wire 36 running through the center of the coil 34. The wire 36 is closed to form a loop. The ends of the coil 34 are contiguous, but not joined. The loop is approximately 4½ inches in diameter. The width of the coil 34 is approximately ¼ inch.

The garter springs 35 are not fixed in position but held only by friction and it has been found that the springs tend to move along the pressure tubes in service, due to the effect of vibrations that occur in operation of the reactor. Over a period of time, the springs may in fact migrate to positions in which they no longer effectively protect against contact between the pressure tube and the calandria tube. FIG. 1 illustrates the relatively complex structure of the fuel channel assembly and the practical impossibility of gaining direct access to the garter springs after the reactor has been put in service.

Figure 2:
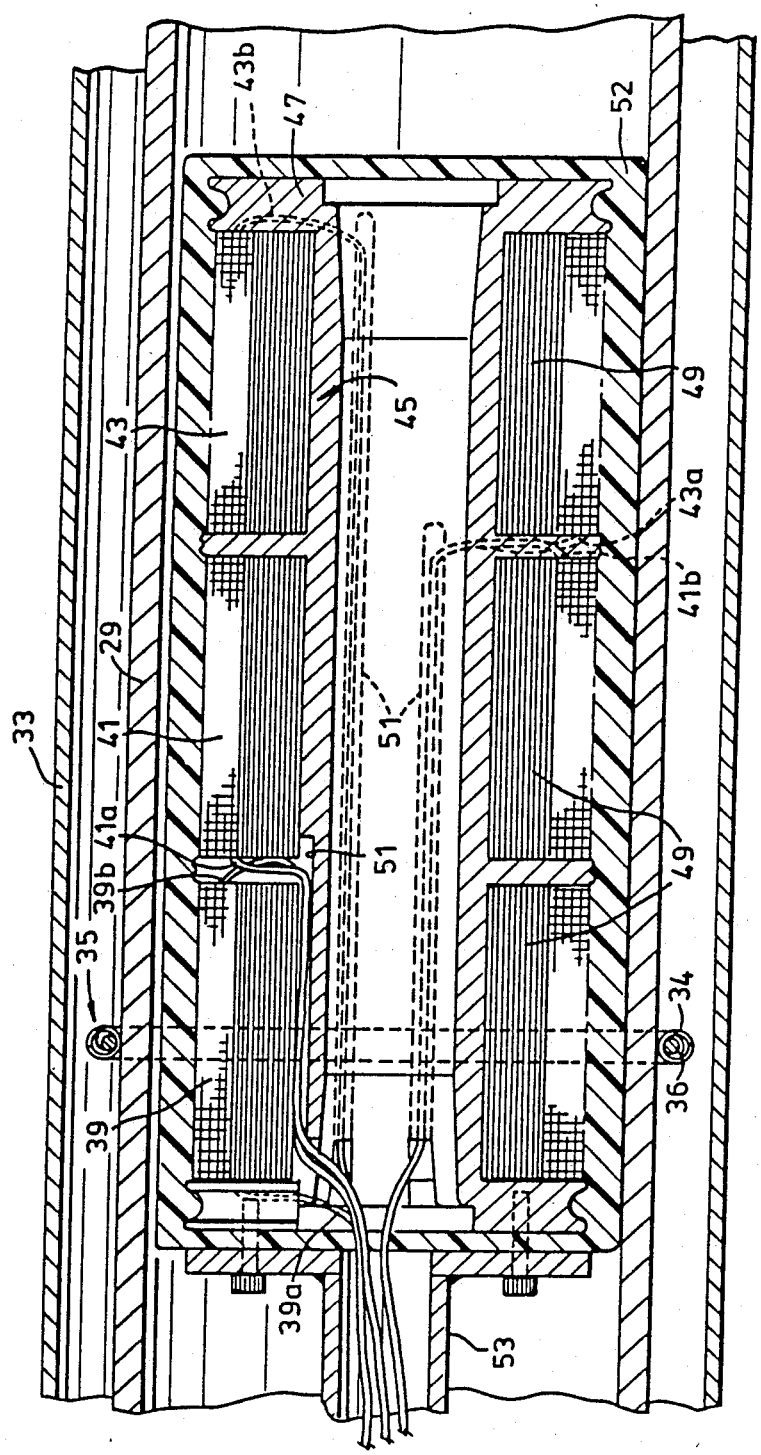
FIG. 2 is a longitudinal sectional view through the apparatus shown in FIG. 1; and, FIG. 3 is a view similar to FIG. 2, showing an alternative form of apparatus in accordance with the invention.

In FIG. 1, reference character "A" denotes generally an electromagnetic apparatus that has been devised for repositioning the garter springs. The apparatus includes an alternating current device 37 (hereinafter called an AC device) that is designed to be inserted into the pressure tube and used to remotely manipulate a mispositioned garter spring, as described below. The AC device itself is shown in longitudinal section in FIG. 2, which will now be described.

AC device 37 is of generally cylindrical shape overall and in fact is dimensioned to approximate the shape of a fuel rod bundle normally contained within the pressure tube. In this particular embodiment the AC device is of three-phase construction and it includes three contiguous coils or windings 39, 41, 43, respectively, made from standard magnet wire. The windings are wound about a high-permeability core 45. The core 45 is divided into a solid core section 47 and individual laminated core sections 49. The core 45 is approximately 10 inches in length and approximately 3 inches in diameter at the outside of the laminated core sections 49. As a very high permeability core will create a stronger field and in turn a stronger force, vanadium permendur was used for the core 45. The windings 39, 41, 43 are wound about the core 45 at the positions of the sections 49. The windings 39, 41, 43 are formed of 200 turns of 14 AWG square magnet wire in five layers. The direction of each winding 39, 41, 43 is the same. The windings 39, 41, 43 are connected to a three-phase current generator 50, shown in FIG. 1, by wires 39a, 39b, 41a, 41b, 43a, 43b, respectively, in a delta configuration. Of course, it is possible to use other configurations which will produce a sufficient level of three-phase current. The wires 39a, 39b, 41a, 41b, 43a, 43b run through three channels 51 in the solid core 47.

The device 37 is coated with a polyurethane resin 52 to make it substantially impermeable to heavy water. Of course, other materials suitable for use within a reactor that serve this function, may be adopted. A handle 53 (see also FIG. 1) extends from one end of device 37 for permitting remote manipulation thereof.

In operation, the relevant fuel channel assembly 1 is emptied of fuel. The channel closure 21 (FIG. 1) is opened and the AC device 37 is inserted through the liner tube 17 and into the pressure tube 29, and is moved to a position within the pressure tube such that one end of the device is in close proximity to the garter spring 35. The position of the garter spring 35 within the pressure tube 29 may be determined using devices embodying standard eddy current techniques. The windings are energized by the generator 50. The frequency should be sufficiently low to penetrate the wall of the pressure tube 29 and high enough to produce sufficient electromagnetic force on the garter spring 35 to cause it to move. In practice, main frequency (50–60 Hz) is satisfactory.

Generator 50 supplies an approximate average current of 100 amps in the windings 39, 41, 43 and an approximate average voltage of 400 volts across the windings. The phase shift between the current in the windings is approximately 120 degrees.

The winding which at any given moment is in close proximity to the garter spring 35 will act as a primary electromagnetic field generator. The windings beside the primary winding will combine to generate a secondary electromagnetic field. If it is assumed that winding 39 is closest to the garter spring, the current in all three windings will produce an electromagnetic field that travels toward winding 43. This induces a current in the wire 36 of the garter spring 35 (wire 36 is the only part of the garter spring that forms a closed loop about the pressure tube 29). To induce maximum current in the wire 36, the longitudinal axis of the device 37 should be generally parallel to the longitudinal axis of the pressure tube 29 (which it will be in practice). The field then acts to produce a force on the garter spring 35, moving it towards winding 43. As the force is continuous and may be controlled by the level of current in the windings 39, 41, 43, the garter spring 35 can be made to come to rest approximately at the end of device 37 nearest the winding 43. In a practical test, the force acting on the garter spring 35 was found to be in the range of approximately 30 to 40 grams.

If it is desired to move the spring 35 in the opposite direction the phase sequence between the windings 39, 41, 43 may be changed so that the field travels from winding 43 to winding 39.

If longer continuous motion is desired AC device 37 may be made of greater length. Alternatively, the device may be made to move along the pressure tube 29, with the garter spring 35 electromagnetically coupled to the device.

Figure 3:
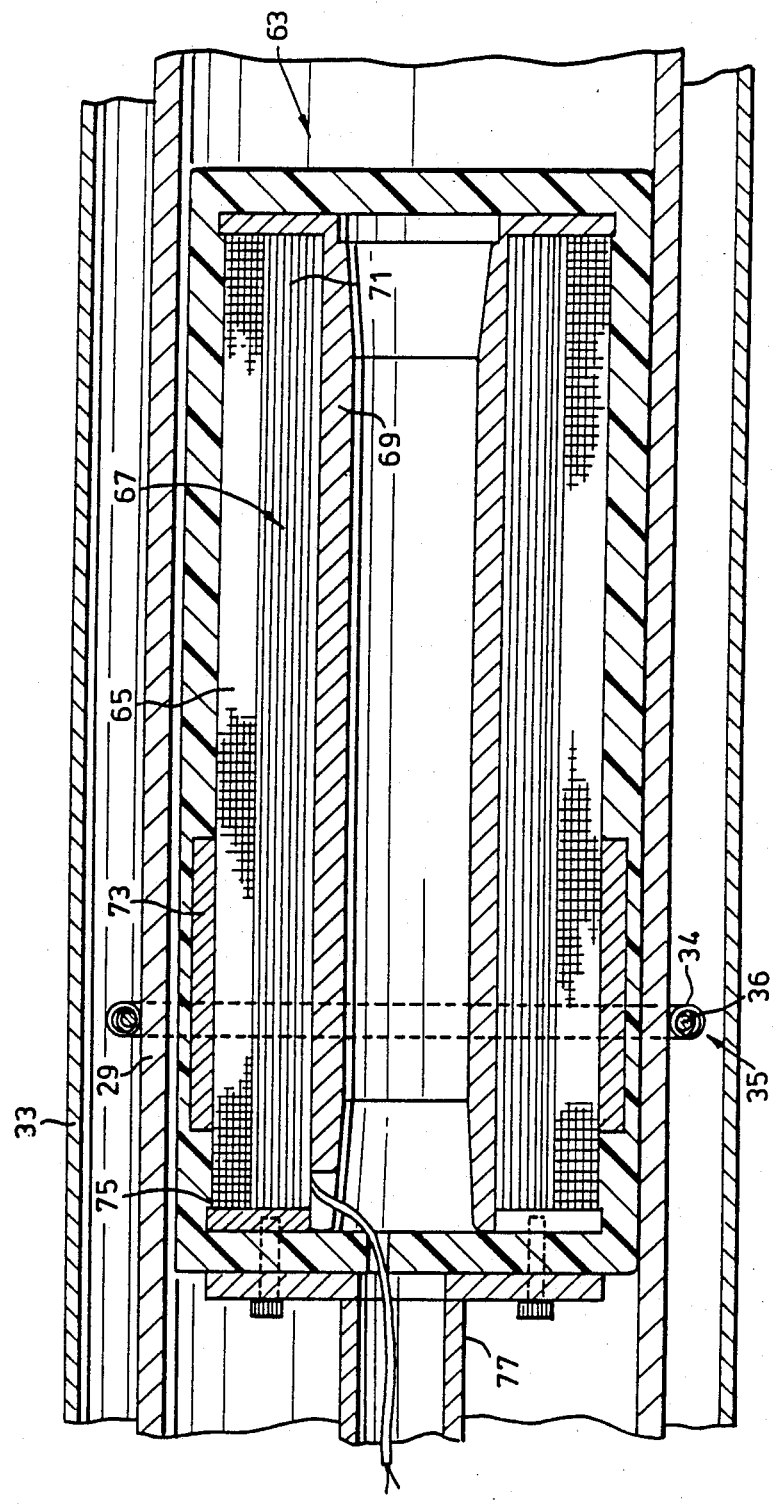

An alternative embodiment of the invention is shown in FIG. 3. In FIG. 3, the AC device is denoted by reference numeral 63 and has a primary coil 65 wound about a high permeability core 67. The core 67 is composed of solid core material 69 and laminated core material 71. A copper ring 73 is placed about a portion of the coil 65. Coil 65 is connected to a single phase current generator similar to generator 50 shown in FIG. 1. Device 63 has an exterior configuration similar to that of the device shown in FIGS. 1 and 2. Device 63 is similarly coated with a polyurethane resin indicated at 75.

In operation, device 63 is placed inside the pressure tube 29 with the coil 65 in close proximity to the garter spring that is to be moved. The coil 65 is energized by an associated current generator (not shown), producing a primary electromagnetic field. The frequency of the generator used is 60 hz although, as mentioned for the previous embodiment, other relatively low frequencies may be used. The primary field induces an eddy current in the wire 36. The primary field also induces an eddy current in the copper ring 73. The current in the copper ring 73 produces a secondary electromagnetic field which is phase shifted approximately 90 degrees with respect to the primary field. The primary and secondary fields produce a resultant travelling electromagnetic field which reacts with the induced current in the wire 36 to exert a force on the garter spring 35. This moves the garter spring 35 from the end of the device remote from the copper ring 73 to the end at which the copper ring is located. Simply stated, the copper ring acts as a shield providing a low magnetic field region where the garter spring tends to "hide", occupying a minimum energy position. In this embodiment, the garter spring 35 can only be moved toward the copper ring 73.

While the present invention has been disclosed in connection with the specific embodiments described, it should be understood that there may be other embodiments which fall within the spirit and scope of the invention. For example, other electromagnetic devices may be used to produce a travelling electromagnetic field. It should also be noted that use of the apparatus provided by the invention is not restricted to the repositioning of garter springs in a nuclear reactor. The invention may be used in other environments for moving a conductive body from a first position to a second position. The apparatus provided by the invention may incorporate other features such as more complex winding arrangements to produce a rotational electromagnetic field in superposition with a linear travelling field so as to create a helical type of motion of the garter spring along the pressure tube.

I claim:

1. An electromagnetic apparatus in combination with a conductive body and a conductive wall screening the body from the apparatus for controllably moving the body from a first position to a second position, the apparatus comprising:
    (a) a primary coil having a high permeability core, the coil being adapted to be energized by an alternating current of frequency and amplitude sufficient to produce a primary alternating electromagnetic field that is capable of penetrating the wall and inducing an eddy current in the conductive body when the primary coil is in the proximity of the conductive body and the conductive body is in the first position; and
    (b) means electromagnetically coupled to the primary coil for producing a phase-shifted secondary alternating electromagnetic field that is reactive with the primary field to produce a resultant electromagnetic field travelling at least between said first position and said second position and of sufficient intensity and of such direction that the resultant of the electromagnetic forces acting on the conductive body causes the body to move from the first position to the second position.

2. The apparatus of claim 1, wherein said wall is a relatively thick conductive tube, wherein the apparatus is disposed within the tube and the conductive body is outside the tube.

3. The invention of claim 2, wherein the tube is a pressure tube of a heavy water-moderated nuclear reactor and is disposed within and spaced from a calandria tube, and wherein the conductive body is a garter spring fitted around the pressure tube for separating the pressure tube from the calandria tube.

4. The invention of claim 1, wherein the frequency of the primary and secondary fields is of line frequency and the fields are continuously excited.

5. The invention of claim 3, wherein said primary coil, core and means for producing a secondary magnetic field comprise a cylindrical device dimensioned to fit closely within said pressure tube, said device being coated by a material rendering the device substantially liquid impermeable.

6. The apparatus of claim 1, wherein the primary coil comprises a plurality of multi-phase windings which are adapted to be energized by a multi-phase current generator to provide a pre-determined current-phase shift between respective windings.

7. The apparatus of claim 6 wherein said primary coil has three windings and wherein the shift between the current phases of the respective windings is approximately 120°, and wherein the frequency of the energizing current is approximately 60 hz.

8. The apparatus of claim 1, wherein the secondary field producing means is a continuous conductive band surrounding a part of the primary coil adjacent an end thereof.

9. The apparatus of claim 1, wherein the frequency of the primary and secondary field sis between about 50 and 60 Hz and the fields are continuously excited.

10. An electromagnetic apparatus for controllably moving a conductive body screened from the apparatus by a conductive wall from a first position to a second position, the apparatus comprising:
(a) a primary coil having a high permeability core, the coil being adapted to be energized by an alternating current of a frequency and amplitude sufficient to produce a primary alternating electromagnetic field; and
(b) means electromagnetically coupled to the primary coil for producing a phase-shifted secondary alternating electromagnetic field that is reactive with the primary field to produce a resultant electromagnetic field.
the primary alternating electric field being capable of penetrating a conductive wall and inducing an eddy current in a conductive body in a first position adjacent the primary coil on an opposite side of the conductive wall therefrom, the resultant electromagnetic field being of sufficient intensity and of such direction that the resultant of the electromagnetic forces acting on the conductive body causes the body to move from the first position to a second position.

11. The apparatus of claim 10, wherein the frequency of the primary and secondary fields is of line frequency and the fields are continuously excited.

12. A apparatus as claimed in claim 10, wherein the secondary alternating electromagnetic field is phase-shifted about 120° from the primary alternating field.

13. The apparatus of claim 16, wherein the primary coil comprises a plurality of multi-phase windings which are adapted to be energized by a multi-phase current generator to provide a pre-determined current phaseshift between respective windings.

14. The apparatus of claim 13, wherein said primary coil has three windings and wherein the shift between the current phases of the respective windings is approximately 120°, and wherein the frequency of the energizing current is approximately 60Hz.

15. The apparatus of claim 10, wherein the secondary field producing means is a continuous conductive band surrounding a part of the primary coil adjacent an end thereof.

* * * * *